United States Patent
Deng

(10) Patent No.: US 9,220,064 B2
(45) Date of Patent: Dec. 22, 2015

(54) METHOD AND APPARATUS FOR ADJUSTING WAKE-UP PERIOD OF A TERMINAL IN A COMMUNICATIONS SYSTEM

(71) Applicant: Huawei Device Co., Ltd., Shenzhen, Guangdong (CN)

(72) Inventor: Yu Deng, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 190 days.

(21) Appl. No.: 14/066,413

(22) Filed: Oct. 29, 2013

(65) Prior Publication Data

US 2014/0056197 A1    Feb. 27, 2014

Related U.S. Application Data

(63) Continuation of application No. PCT/CN2012/080552, filed on Aug. 24, 2012.

(51) Int. Cl.
*G08C 17/00* (2006.01)
*H04W 52/02* (2009.01)

(52) U.S. Cl.
CPC ...... *H04W 52/0225* (2013.01); *H04W 52/0216* (2013.01); *Y02B 60/50* (2013.01)

(58) Field of Classification Search
None
See application file for complete search history.

(56) References Cited

U.S. PATENT DOCUMENTS

2007/0259699 A1    11/2007  Homchaudhuri

2008/0186892 A1    8/2008  Damnjanovic
(Continued)

FOREIGN PATENT DOCUMENTS

| CN | 101094475 A | 12/2007 |
| CN | 102057734 A | 5/2011 |
| CN | 102137475 A | 7/2011 |

(Continued)

OTHER PUBLICATIONS

3GPP TS 25.304 V10.1.0; 3rd Generation Partnership Project; Technical Specification Group Radio Access Network; User Equipment (UE) procedures in idle mode; and procedures for cell reselection in connected mode; Release 10; Jun. 2011; total 52 pages.

*Primary Examiner* — Willie J Daniel, Jr.
(74) *Attorney, Agent, or Firm* — Slater & Matsil, L.L.P.

(57) ABSTRACT

A method and apparatus for adjusting a wake-up period of a terminal in a communications system. In at least one embodiment, the method includes: determining whether a network-side device retransmits a paging message in an area in which the terminal is located; and if a paging message is retransmitted, acquiring a time interval at which the paging message is retransmitted and the number R of times that the paging message is retransmitted, and adjusting the wake-up period of the terminal to a value equal to N times the time interval at which the paging message is retransmitted, wherein N is an integer and $2 \leq N \leq R$. Consequently, when a network-side device has the performance of retransmitting a paging message in the current location area, the terminal does not need to wake up according to a DRX period set by the network side, thereby reducing electric energy consumption of the terminal and extending the standby time.

23 Claims, 9 Drawing Sheets

(56) References Cited

U.S. PATENT DOCUMENTS

| | | |
|---|---|---|
| 2009/0154385 A1 | 6/2009 | Makhija et al. |
| 2009/0310503 A1 | 12/2009 | Tenny et al. |
| 2010/0105351 A1* | 4/2010 | Xu et al. .................... 455/404.1 |
| 2010/0302980 A1 | 12/2010 | Ji et al. |
| 2011/0130100 A1 | 6/2011 | Chen et al. |
| 2012/0115552 A1 | 5/2012 | Bhattacharya |

FOREIGN PATENT DOCUMENTS

| | | |
|---|---|---|
| EP | 1499144 A1 | 1/2005 |
| JP | 2005039471 A | 2/2005 |
| JP | 2010519793 A | 6/2010 |
| JP | 2011508487 A | 3/2011 |
| JP | 2011524693 A | 9/2011 |
| JP | 2012528511 A | 11/2012 |

* cited by examiner

METHOD AND APPARATUS FOR ADJUSTING WAKE-UP PERIOD OF A TERMINAL IN A COMMUNICATIONS SYSTEM

CROSS-REFERENCE TO RELATED APPLICATION

This application is a continuation of International Application No. PCT/CN2012/080552, filed on Aug. 24, 2012, which is hereby incorporated by reference in its entirety.

TECHNICAL FIELD

The present invention relates to the field of communications, and in particular, to a method and apparatus for adjusting a wake-up period of a terminal in a communications system.

BACKGROUND

When a wireless terminal (for example, a mobile phone, a data card, or a tablet computer) communicates with a network, the wireless terminal may switch between an idle state and a connected state. To reduce electric energy consumption of the wireless terminal, when the wireless terminal is in the idle state, the wireless terminal may listen to a paging channel in a discontinuous reception DRX (Discontinuous Reception) manner. The wireless terminal wakes up at a paging occasion of each DRX period according to a standard of a location in which a serving cell lies (at this time, a wake-up period of the wireless terminal is the DRX period), and receives a paging message delivered by a network side device through the paging channel. If the received paging message does not need to be processed (for example, the paging message is sent for another wireless terminal in the same paging group), the wireless terminal goes to sleep after the paging occasion is over. If the received paging message needs to be processed (for example, the paging message is for the wireless terminal itself), the wireless terminal switches from the idle state to the connected state to process the messages. Meanwhile, a wireless terminal may also receive other messages than the paging message, for example, some control messages or a message indicating that a current paging channel is idle. FIG. 1 is a timing diagram illustrating when a wireless terminal is in the idle state.

Conventionally, methods for deciding the DRX period in various networks are different. For example, in a GSM system in China, the DRX period is usually set by a network side device to 470 ms or 940 ms; in a WCDMA system, the DRX period is usually set by a network side device to 640 ms. In a CDMA system and in an LTE system, the DRX period is usually decided by the wireless terminal, according to its service situation, through negotiation with a network side device.

It can be seen from the preceding method for deciding the DRX period that the mobile terminal cannot properly adjust the DRX period. Even if the network adopts paging retransmission during paging message delivery, that is, during delivery of the same paging message multiple times, the mobile terminal still wakes up according to the DRX period decided by the network side. This may result in unnecessary power consumption.

SUMMARY

Embodiments of the present invention provide a method and apparatus for adjusting a wake-up period of a terminal in a communication system. The terminal may adaptively adjust the wake-up period according to a characteristic of a network side device in an area in which the terminal is located, thereby reducing unnecessary power consumption and extending the standby time of the terminal.

According to a first aspect, an embodiment of the present invention provides a method for adjusting a wake-up period of a terminal including:

determining whether a network-side device retransmits a paging message in an area in which the terminal is located; and if a paging message is retransmitted, acquiring a time interval at which the paging message is retransmitted and the number R of times that the paging message is retransmitted, and adjusting a wake-up period of the terminal to a value equal to N times the time interval at which the paging message is retransmitted, where N is an integer and $2 \leq N \leq R$.

According to a second aspect, another embodiment of the present invention provides a terminal in a communications system that includes:

at least one processor configured to determine whether a network-side device retransmits a paging message in an area in which the terminal is located; and if a paging message is retransmitted, acquire a time interval at which the paging message is retransmitted and the number R of times that the paging message is retransmitted, and adjust a wake-up period of the terminal to a value equal to N times the time interval at which the paging message is retransmitted, where N is an integer and $2 \leq N \leq R$.

Consequently, in at least some embodiments of the present invention when the network side device has the performance of retransmitting a paging message in the current location area, the terminal does not need to wake up according to a DRX period set by the network side, thereby reducing electric energy consumption of the terminal and extending the standby time.

DESCRIPTION OF EMBODIMENTS

Figure 1:
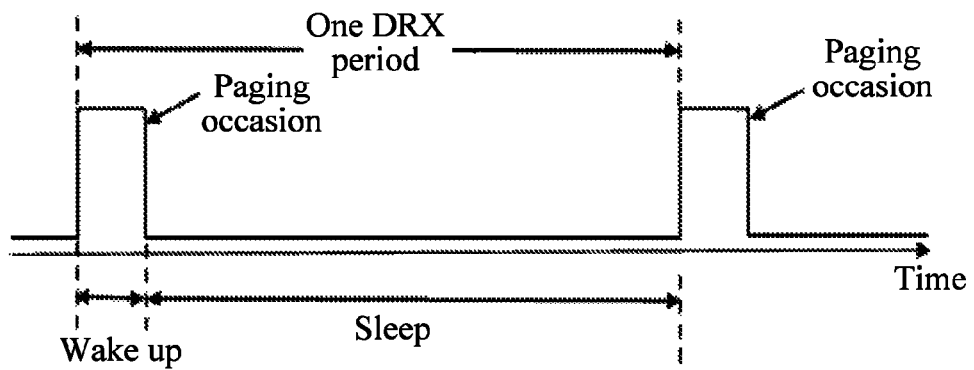
FIG. 1 is a timing diagram illustrating when a terminal is in idle mode.
Figure 2:
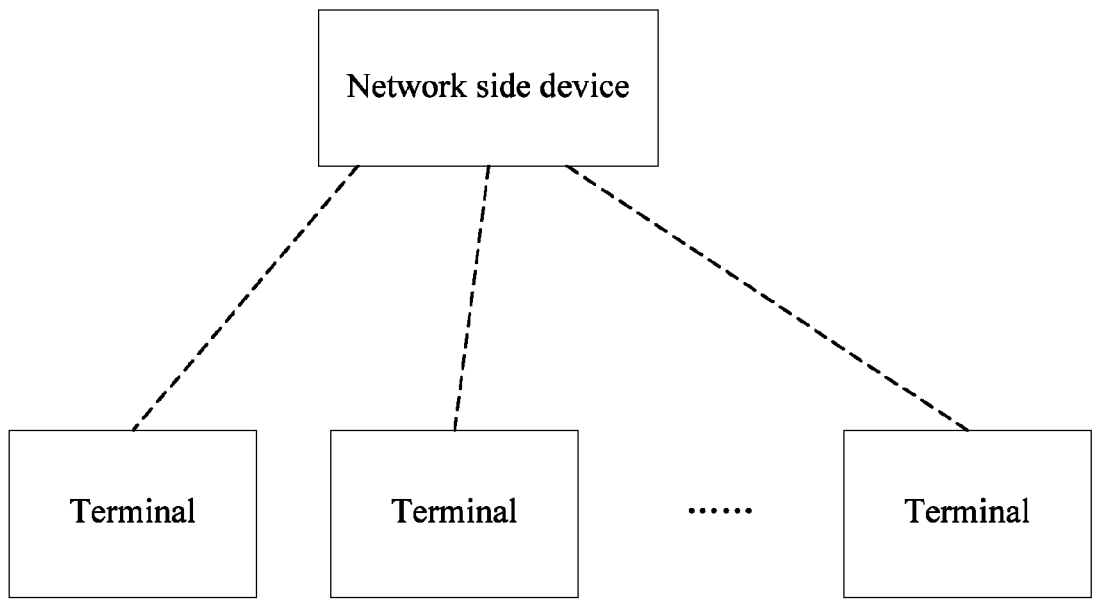
FIG. 2 is a schematic diagram of a communications system in which embodiments of the present invention may be used.

FIG. 2 shows a communications system in which embodiments of the present invention may be implemented. Embodiments of the present invention are applicable to various wireless communications systems using a DRX period, for example, a GSM system, a WCDMA system, a CDMA system, and an LTE system, as well as various wired communications networks using the DRX period. The following embodiments take a wireless communications network as an example for illustration purposes only.

The communications system includes a network side device and a terminal, in which the network side device transmits a paging message or another message to the terminal through a paging channel.

The network side device may comprise any non-terminal device in the communications network, for example a base station (for example, a Node B) or a wireless network controller. The terminal may comprise any device that can communicate with a network, including a mobile phone, a personal digital assistant (PDA), a wireless modem, a tablet computer, a notebook computer, or a fixed terminal that communicates with a network in a wired manner and wakes up periodically.

When the terminal is in an idle state, a call for the terminal may occur, and the network side device notifies the terminal of the call by transmitting a paging message. To receive the paging message in the idle state, the terminal periodically wakes up to receive the paging message or another message. Through the paging channel, in addition to receiving the paging message for the terminal, the terminal may also receive a paging message for another terminal in the same paging group or a message indicating that the paging channel is idle.

It should be noted that, in the following embodiments, before the wake-up period of the terminal is adjusted, a message delivered by the network side device is received by the terminal when the terminal wakes up in each wake-up period before adjustment, and after the wake-up period of the terminal is adjusted, a message delivered by the network side device is received by the terminal when the terminal wakes up in each adjusted wake-up period.

Embodiment 1

Figure 3:
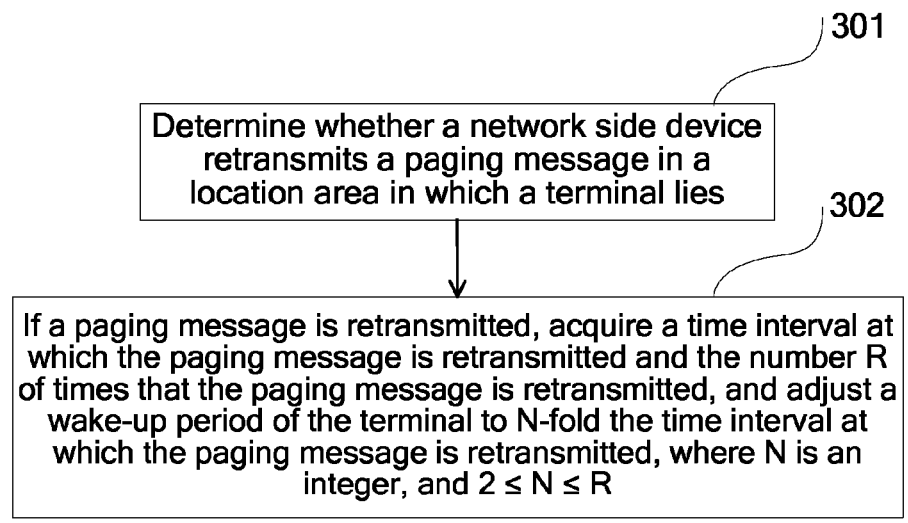
FIG. 3 is a flow chart of a method for adjusting a wake-up period of a terminal according to an Embodiment 1 of the present invention.

FIG. 3 is a flow chart of a method according to an Embodiment 1 of the present invention. The method for adjusting a wake-up period of a terminal shown in FIG. 3 includes:

Step 301: Determine whether a network side device retransmits a paging message in a location area in which the terminal lies.

It should be noted that execution of step 301 is triggered under various conditions, for example, it may be triggered when the terminal enters a new location area, when the terminal is started, and after a method used for previously adjusting a wake-up period of the terminal operates (for details, reference can be made to the following embodiments), and it may also be triggered through an instruction input by a user or the like.

Step 302: If a paging message is retransmitted, acquire a time interval at which the paging message is retransmitted and the number R of times that the paging message is retransmitted, and adjust the wake-up period of the terminal to a value equal to N times the time interval at which the paging message is retransmitted, where N is an integer and $2 \leq N \leq R$.

In step 302, the time interval at which the paging message is retransmitted refers to a time interval between the time when the network side device transmits a paging message and the time when the network side device transmits the paging message again. For example, when the terminal wakes up in a first wake-up period of the terminal, the network side device delivers a paging message a, and if the network side device delivers the paging message a again when the terminal wakes up in a second wake-up period of the terminal, at this time, the time interval at which the paging message is retransmitted is one wake-up period of the terminal. If the network side device delivers the paging message a again when the terminal wakes up in an $i^{th}$ wake-up period of the terminal, at this time, the time interval at which the paging message is retransmitted is i−1 wake-up periods of the terminal. Since "the wake-up period of the terminal" is adjusted, for ease of distinction, "the wake-up period of the terminal" before adjustment is also referred to as a "wake-up period before adjustment".

The time interval at which the paging message is retransmitted and the number R of times that the paging message is retransmitted may be acquired by querying the network side device and may also be measured according to the paging message received by the terminal (for example, as described in the subsequent Embodiment 2 and Embodiment 3).

The wake-up period of the terminal in embodiments of the present invention may comprise a DRX period of the terminal. The wake-up period before adjustment may be decided by the network side device to which the terminal belongs or may be decided by the network side device and the terminal through negotiation, or may also be a wake-up period that has been previously adjusted according to step 302. For example, in a GSM system in China, the DRX period may be set by a network side device to 470 ms or 940 ms; in a WCDMA system, the DRX period may be set by a network side device to 640 ms. In a CDMA system and an LTE system, the DRX period may be decided by a wireless terminal, according to its service situation of the wireless terminal, through negotiation with a network side device.

In this embodiment, if the terminal repeatedly receives a paging message sent by the network side device (that is, the network in which the terminal lies delivers the same paging message more than once in a current location area), according to the number R of times that the paging message is retransmitted and the time interval at which the paging message is retransmitted, the wake-up period of the terminal is adjusted to N-fold (i.e., N times) the time interval at which the paging message is retransmitted, where N is an integer and $2 \leq N \leq R$. The value of N needs to be decided according to the number of times that the network side device repeatedly transmits the paging message, and the selection of N is illustrated in detail in a subsequent embodiment.

In the method for adjusting a wake-up period of a terminal provided in Embodiment 1, when it is identified that a network side device repeatedly transmits a paging message in a location area in which the terminal lies, the wake-up period of the terminal is adjusted to N-fold the time interval at which the paging message is retransmitted, where N is an integer and $2 \leq N \leq R$, so that when the network side device has the performance of retransmitting a paging message in the location area in which the terminal lies, the terminal does not need to still wake up according to a wake-up period set by the network side device, thereby reducing electric energy consumption of the terminal and extending standby time.

Alternatively, in another implementation of Embodiment 1, in addition to steps 301 and 302, the method for adjusting a wake-up period of a terminal further includes: if the terminal enters a new location area, stopping an ongoing process of adjusting the wake-up period of the terminal. This step ensures that the wake-up period of the terminal always matches the performance of the location area in which the terminal currently lies. If the terminal enters a new location area, whether to adjust and how to adjust the wake-up period of the terminal depend on the performance of the new location area.

Alternatively, in yet another implementation of Embodiment 1, in addition to steps 301 and 302, the method for adjusting a wake-up period of a terminal further includes: if it is determined that the network side device does not retransmit a paging message in the location area in which the terminal lies, keeping the wake-up period of the terminal unchanged. This step enables the wake-up period of the terminal to be adjusted only when the network side device retransmits a paging message in the current location area, which avoids a situation that the terminal loses a paging message because of inappropriate adjustment of the wake-up period of the terminal.

Alternatively, in still another implementation of Embodiment 1, in addition to steps 301 and 302, if a paging message is retransmitted, before the wake-up period of the terminal is adjusted to N-fold the time interval at which the paging message is retransmitted, the method for adjusting a wake-up period of a terminal also includes: waiting a preset time; determining whether an interruption event occurs within the preset time, if no interruption event occurs, after the wait is over, adjusting the wake-up period of the terminal to N-fold the time interval at which the paging message is retransmitted; and if an interruption event occurs, from the time when the interruption event occurs, waiting the preset time again, and then adjusting the wake-up period of the terminal to N-fold the time interval at which the paging message is retransmitted. The interruption event herein may be an event that demands configuration of a Layer 1 layer (that is, a physical layer) that is on the terminal and at which the wake-up period of the terminal is stored, for example, establishment of a service connection of the terminal or cell reselection by the terminal. This step avoids a collision caused by simultaneous configuration of the Layer 1 layer (that is, the physical layer), thereby improving the stability of the method for adjusting a wake-up period of a terminal while without affecting other operations of the terminal.

Embodiment 2

Figure 4:
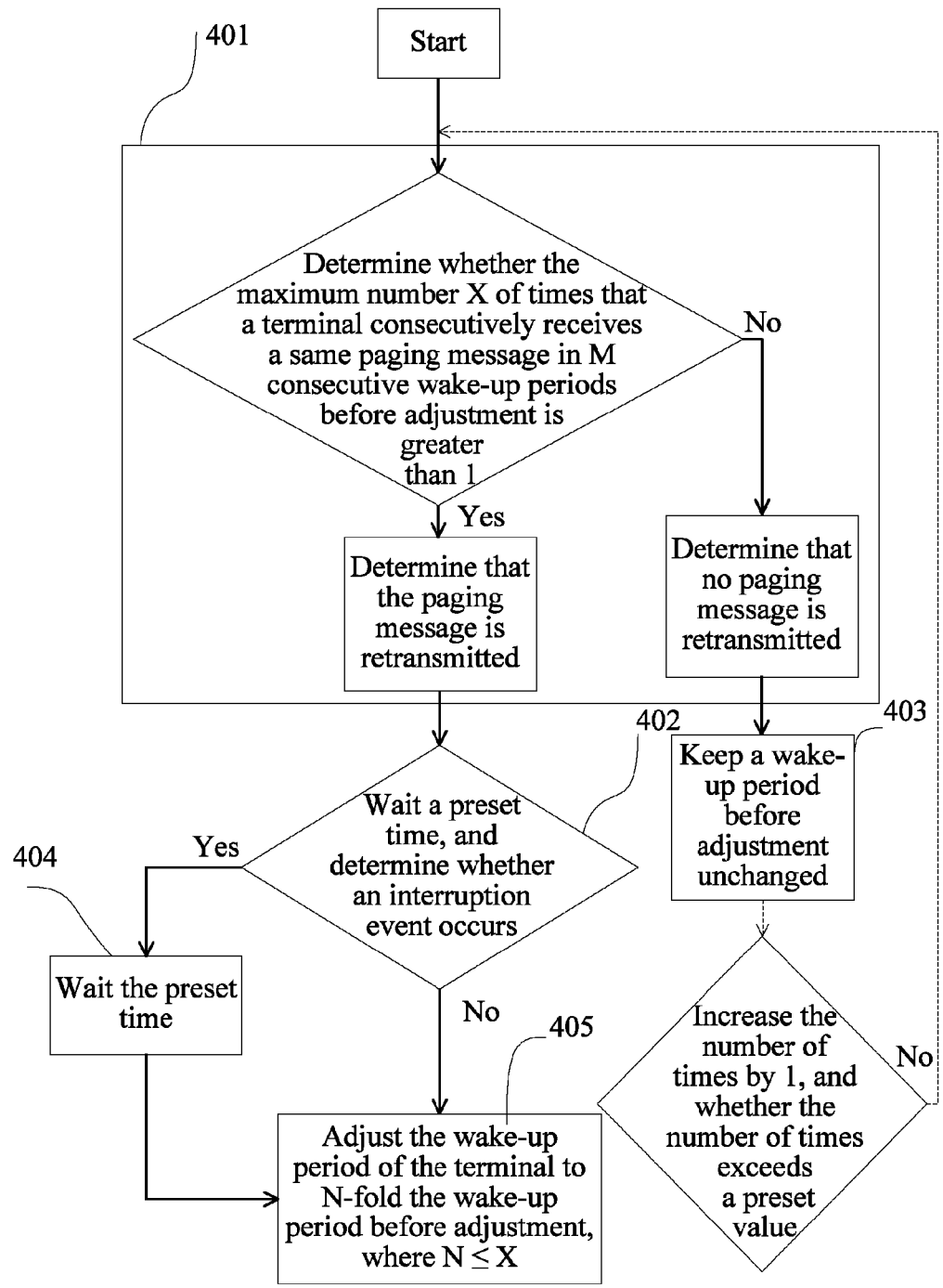
FIG. 4 is a flow chart of a method for adjusting a wake-up period of a terminal according to an Embodiment 2 of the present invention.

FIG. 4 is a flow chart of a method for adjusting a wake-up period of a terminal according to an Embodiment 2 of the present invention. The method includes:

Step 401: Determine whether the maximum number X of times that a terminal consecutively receives a same paging message in M consecutive wake-up periods before adjustment is greater than 1, where M is an integer, and M>1. If X is greater than 1, determine that the paging message is retransmitted, and go to step 402; and if X=1, determine that no paging message is retransmitted, and go to step 403.

Step 401 is triggered under same conditions as step 301, which is not described herein again. In this embodiment, determining whether a network side device retransmits a paging message in a location area in which the terminal lies is: determining whether the maximum number X of times that the terminal consecutively receives a same paging message in M consecutive wake-up periods before adjustment is greater than 1; if X is greater than 1, determining that the paging message is retransmitted; and if X is equal to 1, determining that no paging message is retransmitted.

The value of M is an integer greater than or equal to 2, and when the value of M is greater, the possibility that an actual period for transmitting a paging message by the network side is detected is higher. However, when the value of M is greater, the time required for the detection is also longer; therefore, M is generally adjusted to an appropriate number, for example, an integer not greater than 5. For example, if the value of M is 6, and if paging messages respectively received when the terminal wakes up in 6 consecutive wake-up periods of the terminal are a, a, b, b, b, and c (where a, b, and c each represent different paging messages), the number of times that a network side device repeats a paging message is 2 or 3, and the maximum number of times thereof (that is, the value of X) is 3.

At this time, a time interval at which the paging message is retransmitted is equal to a wake-up period before adjustment, the number of times that the paging message is retransmitted is R=X=3, and the wake-up period of the terminal may subsequently be adjusted to twice or three times the value of the wake-up period before adjustment.

In this embodiment, the same paging messages refer to paging messages having the same type and content. Types of paging messages include a TMSI (Temporary Mobile Subscriber Identity), a PTMSI (Packet Switch Domain Temporary Mobile Subscriber Identity), and an IMSI (International Mobile Subscriber Identity). Correspondingly, contents of paging messages are a TMSI number (4 bytes), a PTMSI number (4 bytes), and an IMSI number (8 bytes) respectively. A paging message received by the terminal may be for another terminal and may also be for itself. If the terminal receives a paging message for another terminal, the messages are recorded for the determining in step 401. If a paging message for this terminal is received, the terminal may directly process the paging message and enter a corresponding connected state as in the prior art, and may also temporarily not process the paging message, but instead firstly record the received paging message for the determining in step 401 and then process the received paging message later (for example, wait until a message transmitted by the network side device is received in a next wake-up period, or wait for another time point).

Step 402: Wait a preset time, and determine whether an interruption event occurs in the preset time, if yes, go to step 404, and if no, go to step 405.

Step 403: Keep the wake-up period before adjustment unchanged.

When a same paging message is not consecutively received in the M consecutive wake-up periods before adjustment, that is, X=1, the wake-up period before adjustment is not modified at this time, and the process does not go to step 401. Alternatively, if X=1, the wake-up period before adjustment may also be temporarily not modified and the number of times that step 401 is executed is counted. If the number of times that step 401 is executed is not greater than a preset value, return to step 401, and if the number of times that step 401 is executed is greater than the preset value (for example, 10 times), the wake-up period before adjustment is no longer adjusted unless another trigger condition, for example, that the terminal enters a new location area or that the terminal is restarted, is met.

Step 404: Wait the preset time, and go to step 405.

Step 405: Adjust the wake-up period of the terminal to N-fold the wake-up period before adjustment, where N≤X.

It should be understood that, if a network in which the terminal lies retransmits a paging message in a current location area (that is, X>1), before the wake-up period of the terminal is adjusted to N-fold the wake-up period before adjustment, the method for adjusting a wake-up period of a terminal also includes: step 402—waiting a preset time; determining whether an interruption event occurs in the preset time, and if not, after the wait is over, going to step 405—adjusting the wake-up period of the terminal to N-fold the wake-up period before adjustment; and if an interruption event occurs in the preset time, from the time when the interruption event occurs, waiting the preset time again, and adjusting the wake-up period of the terminal to N-fold the wake-up period before adjustment, where the value of N meets the condition that 2≤N≤X. The interruption event herein may be an event that demands configuration of a LAYER 1 layer (that is, a physical layer) that is on the terminal and at which the wake-up period of the terminal is stored, for example, service connection establishment for the terminal or cell reselection performed by the terminal. To avoid a collision caused by simultaneous configuration of the Layer 1 layer (that is, the physical layer), the operation of adjusting the wake-up period of the terminal needs to be delayed for a preset time, and the operation of adjusting the wake-up period of the terminal is performed after the interruption event ends. The preset time herein may be set to 5 seconds or another appropriate duration of time.

Steps 402 and 404 are optional and may be omitted. That is to say, when it is determined in step 401 that the paging message is retransmitted, step 405 may be directly performed. In a process of executing steps 401 to 405, if the terminal enters a new location area, the ongoing method for adjusting a wake-up period of a terminal is stopped. After the stop herein, the terminal may no longer adjust the wake-up period of the terminal in the current location area, and may also restart to adjust the wake-up period of the terminal (that is, restart the execution from step 401).

According to the method for adjusting a wake-up period of a terminal provided in Embodiment 2, it is determined whether the maximum number X of times that the terminal consecutively receives a same paging message in M consecutive wake-up periods before adjustment is greater than 1, and if yes, the wake-up period of the terminal is adjusted to an integer times a wake-up period before adjustment, where the integer is less than or equal to X, so that when a network side device has the performance of retransmitting a paging message in a current location area, the terminal does not need to still wake up according to a wake-up period set by the network side, thereby reducing electric energy consumption of the terminal and extending a standby time of the terminal. Meanwhile, because of a wait of a preset time before the wake-up period of the terminal is adjusted, a collision that may be caused by adjusting the wake-up period of the terminal is avoided, the stability of the adjusting method is improved, and other operations of the terminal are not influenced.

Embodiment 3

Figure 5A:
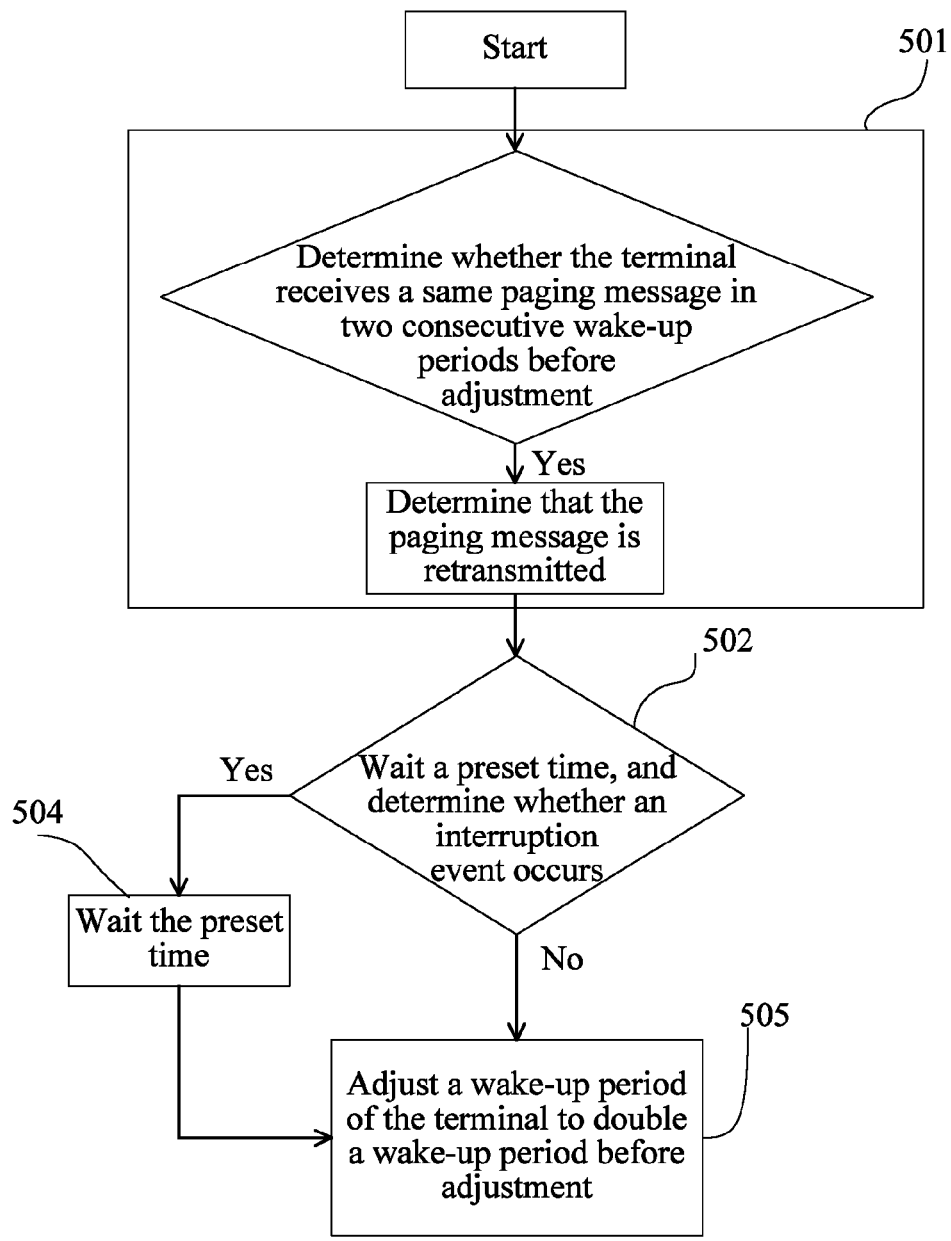
FIG. 5a is a flow chart of a method for adjusting a wake-up period of a terminal according to an Embodiment 3 of the present invention.

FIG. 5a is a flow chart of a method for adjusting a wake-up period of a terminal according to an Embodiment 3 of the present invention. The method includes:

Step 501: Determine whether a terminal receives a same paging message in two consecutive wake-up periods before adjustment, and, if yes, determine that the paging message is retransmitted, and go to step 502.

Step 501 is triggered under same conditions as step 301 and step 401, which are not described herein again. In this implementation, how many times a network side device retransmits a paging message is not detected, and it is only determined whether a network side device consecutively delivers a paging message twice (that is, delivering one same paging message in two consecutive wake-up periods before adjustment), which is equal to determining whether the number R of times that a paging message is retransmitted is greater than or equal to 2 and whether a time interval at which a paging message is retransmitted is one wake-up period before adjustment.

Figure 5B:
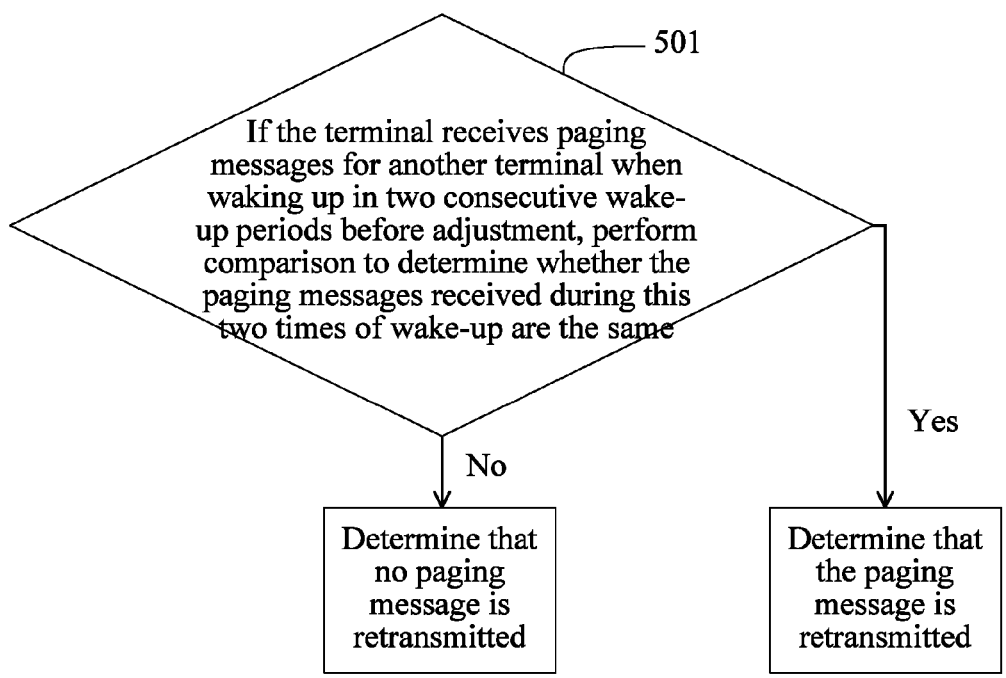
FIG. 5b is a flow chart of a first implementation of step 501.

FIG. 5b is a flow chart of a first implementation of step 501. The first implementation of step 501 includes: if the terminal receives paging messages for another terminal when waking up in two consecutive wake-up periods before adjustment, performing a comparison to determine whether the paging messages received during this two times of wake-up are the same; if yes, determining that the paging message is retransmitted, and going to step 502; and if no, determining that no paging message is retransmitted.

Figure 5C:
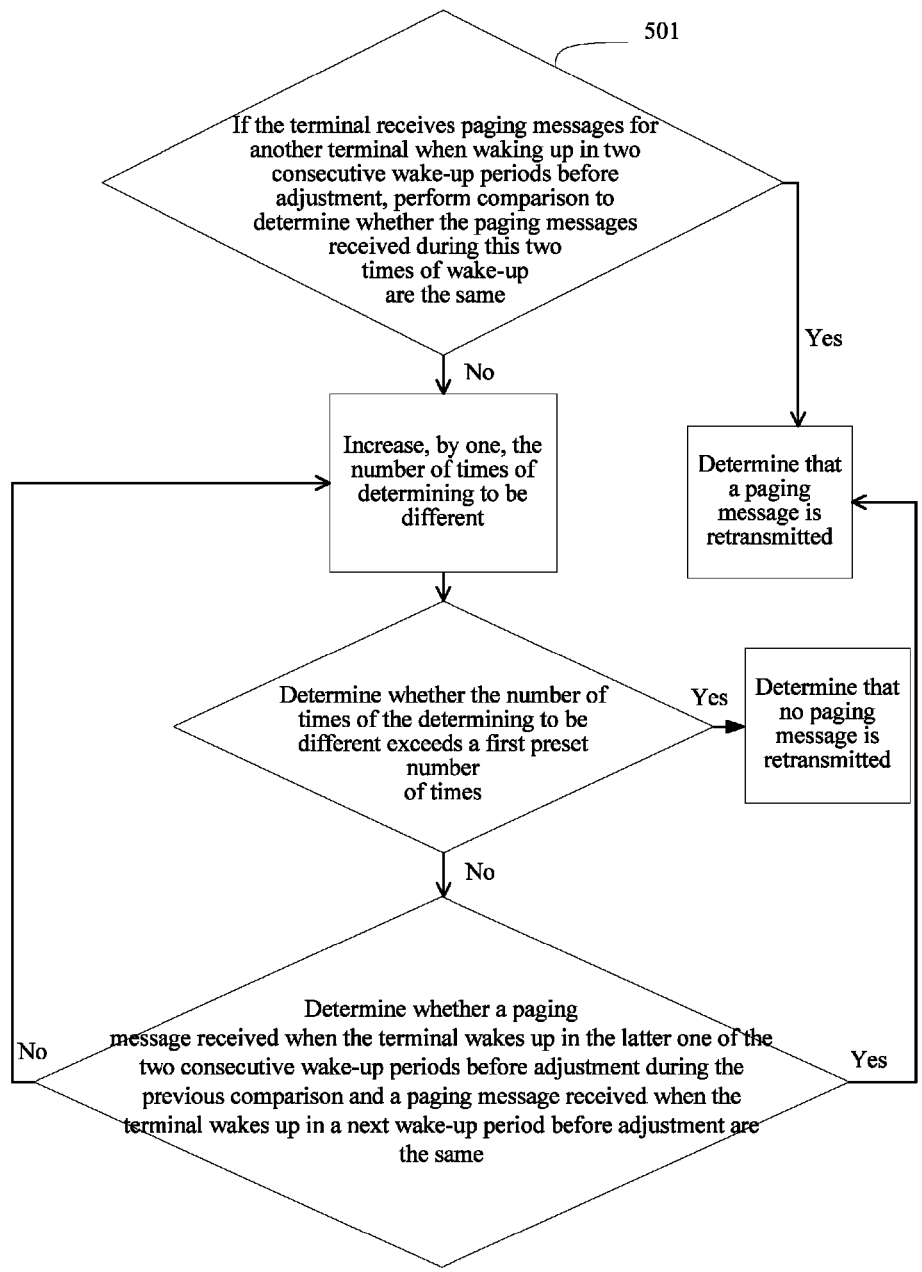
FIG. 5c is a flow chart of a second implementation of step 501.

FIG. 5c is a flow chart of a second implementation of step 501. The second implementation of step 501 includes:

if the terminal receives paging messages for another terminal when waking up in two consecutive wake-up periods before adjustment, performing a comparison to determine whether the paging messages received during this two times of wake-up are the same;

if yes, determining that the paging message is retransmitted, and going to step 502; and if no, increasing, by one, the number of times of determining to be different; if the number of times of the determining to be different is greater than a first preset number of times, determining that no paging message is retransmitted; and if the number of times of the determining to be different is not greater than the first preset number of times, continuing to determine whether a paging message received when the terminal wakes up in the latter one of the two consecutive wake-up periods before adjustment during the previous comparison and a paging message received when the terminal wakes up in a next wake-up period before adjustment are the same until it is determined that the paging message is retransmitted (next, going to step 502) or it is determined that no paging message is retransmitted.

In the two implementations of step 501, alternatively, if it is determined that no paging message is retransmitted, the wake-up period of the terminal is not adjusted, and the wake-up period before adjustment is kept unchanged.

In the second implementation of step 501, the number of times that paging messages are determined to be different is counted, so as to prevent incorrect determination. If paging messages delivered by a network are successively a, a, b, b, c, and c, and the two consecutive wake-up periods before adjustment selected for determining are just a wake-up period before adjustment when the second message a is received and a wake-up period before adjustment when the first message b is received, and if comparison is only performed once, it may be incorrectly determined that the network does not retransmit a paging message. Alternatively, after a conclusion that the paging messages are different is obtained through comparison of the wake-up period before adjustment when the second message a is received and the wake-up period before adjustment when the first message b is received, the wake-up period before adjustment when the first message b is received and a wake-up period before adjustment when the second message b is received are subsequently compared until a determination result is obtained, that is, it is eventually determined that a paging message is retransmitted or it is eventually determined that no paging message is retransmitted.

Alternatively, in the two implementation of step 501, if the terminal receives a message indicating that a paging channel is idle when waking up in any wake-up period before adjustment, the message indicating that the paging channel is idle is discarded.

Alternatively, after the message indicating that the paging channel is idle is discarded, the following is further included: recording the number of times that the terminal receives the message indicating that the paging channel is idle; if the recorded number of times is greater than a second preset number of times (for example, it is set to 10 times), determining that no paging message is retransmitted; and if the recorded number of times is not greater than the second preset number of times, continuing to determine whether the terminal receives a same paging message when waking up in the next two DRX periods.

The following makes a specific illustration according to situations, and it is assumed that step 501 starts to be executed in a $Y^{th}$ (Y representing any positive integer) wake-up period before adjustment.

If the terminal receives a paging message for another terminal when waking up for a $Y^{th}$ time and the terminal receives a paging message for another terminal when waking up for a $Y+1^{th}$ time, and it is determined whether the two paging messages are the same. If the two paging messages are the same, it is determined that the paging message is retransmitted, and the process goes to step 502. If the two paging messages are different, it is determined that no paging message is retransmitted, or a first counter is increased by 1, and if the first counter does not reach the first preset number of times, a message delivered by the network when the terminal wakes up in a $Y+2^{th}$ wake-up period before adjustment continues to be received, and it is determined whether a same message is received when the terminal wakes up for the $Y+1^{th}$ time and for a $Y+2^{th}$ time. A specific determining method is the same as the determining performed when the terminal wakes up for the $Y^{th}$ time and the $Y+1^{th}$ time, which is not repeated herein again. If the first counter reaches the first preset number of times, it is determined that no paging message is retransmitted.

If the terminal receives a paging message for another terminal when waking up for a $Y^{th}$ time and the terminal receives a message indicating that the paging channel is idle when waking up for a $Y+1^{th}$ time, the terminal discards the message indicating that the paging channel is idle, and a second counter is increased by 1. If the second counter does not reach the second preset number of times, messages delivered by the network during wake-up in a $Y+2^{th}$ period and a $Y+3^{th}$ period continue to be received, and it is determined whether a same paging message is received during wake-up for a $Y+2^{th}$ time and a $Y+3^{th}$ time. A specific determining method is the same as the determining performed when the terminal wakes up for the $Y^{th}$ time and the $Y+1^{th}$ time, which is not repeated herein again. If the second counter reaches the second preset number of times, it is determined that no paging message is retransmitted.

If the terminal receives a message indicating that the paging channel is idle when waking up for a $Y^{th}$ time, the terminal discards the message indicating that the paging channel is idle, and a second counter is increased by 1. If the second counter does not reach the second preset number of times, messages delivered by the network during wake-up in a $Y+1^{th}$ period and a $Y+2^{th}$ period continue to be received, and it is determined whether a same paging message is received during wake-up for a $Y+1^{th}$ time and a $Y+2^{th}$ time. A specific determining method is the same as the determining performed when the terminal wakes up for the $Y^{th}$ time and the $Y+1^{th}$ time, which is not repeated herein again. If the second counter reaches the second preset number of times, it is determined that no paging message is retransmitted.

In this embodiment, the same paging messages refer to paging messages having completely the same type and content. Types of paging messages include a TMSI, a PTMSI, and an IMSI. Correspondingly, contents of paging messages are a TMSI number (4 bytes), a PTMSI number (4 bytes), and an IMSI number (8 bytes) respectively. A paging message received by the terminal may be for another terminal and may also be for itself. If the terminal receives a paging message for another terminal, these messages are recorded for the determining in step 501. If a paging message for this terminal is received, the terminal may directly process the paging message and enter a corresponding connected state as in the prior art, and may also temporarily not process the paging message, and instead firstly record the received paging message for the determining in step 501 and then process the received paging message later (for example, wait until a message transmitted by the network side device is received in a next wake-up period, or wait for another time point).

Step 502: Wait a preset time, and determine whether an interruption event occurs in the preset time, if yes, go to step 504, and if no, go to step 505.

Step 504: Wait the preset time, and go to step 505.

Step 505: Adjust the wake-up period of the terminal to twice the wake-up period before adjustment.

In step 505, the wake-up period of the terminal is adjusted to twice the wake-up period before adjustment, so that the terminal does not miss a paging message for itself. Meanwhile, a speed at which the terminal responds to a paging message is not significantly influenced, and user experience is not influenced.

It should be noted that description about steps 502 and 504 is the same as that about steps 402 and 404, which is not repeated herein again. Steps 502 and 504 are optional and may be omitted. That is, after it is determined in step 501 that the paging message is retransmitted, the process goes to step 505. In a process of executing steps 501 to 505, if the terminal enters a new location area, the ongoing method for adjusting a wake-up period of a terminal is stopped. After the stop herein, the terminal may no longer adjust the wake-up period of the terminal in the new location area, and may also restart to adjust the wake-up period of the terminal (that is, restart the execution from step 501).

According to the method for adjusting a wake-up period of a terminal provided in Embodiment 3, it is determined whether a network side device delivers the same paging message in two consecutive periods in a location area in which the terminal lies, if yes, the wake-up period of the terminal is adjusted to twice the wake-up period before adjustment, so that when the location area in which the terminal lies has the performance of retransmitting a paging message, the terminal does not need to still wake up according to a wake-up period of the terminal set by the network side device, thereby reducing electric energy consumption of the terminal and extending a standby time. Meanwhile, a speed at which the terminal responds to a paging message is not significantly influenced, and user experience is not influenced. In another aspect, because of a wait of a preset time before the wake-up period of the terminal is adjusted, a collision that may be caused by adjusting the wake-up period of the terminal is avoided. In yet another aspect, a failure in accurately determining whether a paging message is retransmitted when a paging channel is idle is also avoided.

Alternatively, on the basis of the various methods for adjusting a wake-up period of a terminal in Embodiment 1 to Embodiment 3, before the wake-up period of the terminal is adjusted to N-fold the time interval at which the paging message is retransmitted, the method for adjusting a wake-up period of a terminal further includes: transmitting a request message to the network side device, where the request message is used to request the network side device to allow adjustment of the wake-up period of the terminal to N-fold the time interval at which the paging message is retransmitted, if a response that is transmitted by the network side device and indicates that the adjustment is allowed is received, adjusting the wake-up period of the terminal to N-fold the time interval at which the paging message is retransmitted; otherwise, stopping the ongoing adjustment of the wake-up period of the terminal, and keeping the wake-up period before adjustment unchanged. In the solution to requesting a permit from the network side device, the network side device may learn that the wake-up period of the terminal is being adjusted, and may control whether the adjustment is to be performed.

It should be noted that the method for adjusting a wake-up period of a terminal in Embodiment 1 to Embodiment 3 further includes a process of "waiting a preset time and determining whether an interruption event occurs in the preset time" (steps 402 and 404, or steps 502 and 504). The process of requesting a permit from the network side device may be before the process of "waiting a preset time and determining whether an interruption event occurs in the preset time" and after it is determined that the paging message is retransmitted. If a response that is sent by the network side device and indicates that the adjustment is allowed is received, the process of "waiting a preset time and determining whether an interruption event occurs in the preset time" is executed; otherwise, the ongoing adjustment of the wake-up period of the terminal is stopped, and the wake-up period before adjustment is kept unchanged. Alternatively, the process of requesting a permit from the network side device may be executed after it is determined that the paging message is retransmitted and after the process of "waiting a preset time and determining whether an interruption event occurs in the preset time".

Embodiment 4

Embodiment 4 of the present invention provides a computer program. The computer program includes a program code, and when the computer program is run on a computer, the program code is used to execute the method for adjusting a wake-up period of a terminal in Embodiment 1 to Embodiment 3, which is not repeated herein again.

Embodiment 5

Embodiment 5 of the present invention provides a computer readable storage medium, configured to store one or more computer programs. The one or more computer programs include a program code, and when a computer program is run on a computer, the program code is used to execute the method for adjusting a wake-up period of a terminal in Embodiment 1 to Embodiment 3, which is not repeated herein again. The storage medium may be a ROM/RAM, a magnetic disk, or an optical disk.

Embodiment 6

Figure 6A:
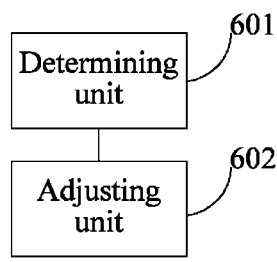
FIG. 6a is a block diagram of a first implementation of an apparatus according to an Embodiment 6 of the present invention.

FIG. 6a is a block diagram of a first implementation of an apparatus according to an Embodiment 6 of the present invention. The apparatus includes: a determining unit 601, configured to determine whether a network side device retransmits a paging message in a location area in which the terminal lies; and an adjusting unit 602, configured to, when the determining unit determines that a paging message is retransmitted, acquire a time interval at which the paging message is retransmitted and the number R of times that the paging message is retransmitted, and adjust the wake-up period of the terminal to N-fold the time interval at which the paging message is retransmitted, where N is an integer, and $2 \leq N \leq R$.

Figure 6B:
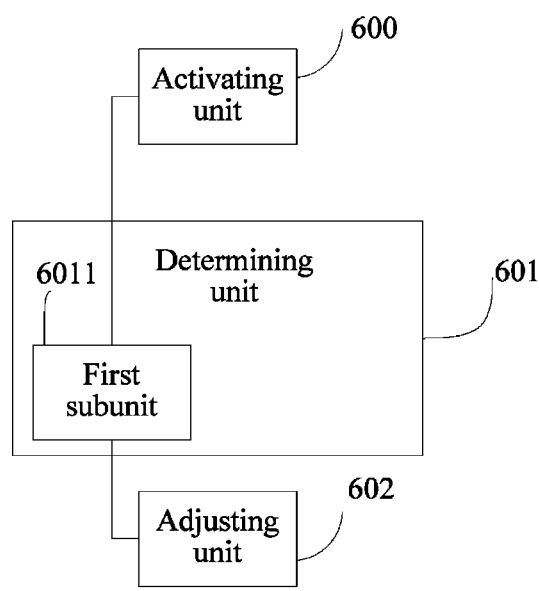
FIG. 6b is a block diagram of a second implementation of an apparatus according to an Embodiment 6 of the present invention.

It should be noted that, as shown in FIG. 6b, it may be a separate activating unit 600 that triggers the determining unit 601 to be activated and to start to determine whether a paging message is retransmitted. If the activating unit 600 determines that the apparatus enters a new location area or the apparatus is started, it triggers the determining unit 601 to be activated, or the activating unit 600 triggers, according to an instruction input by a user, the determining unit 601 to be activated. In a certain operation process of the determining unit 601, the determining unit 601 may also be triggered to continue to operate after the ongoing operation is finished, and a specific situation is illustrated in a subsequent implementation.

In the first implementation of the apparatus, when the location area in which the terminal lies has the performance of retransmitting a paging message, the terminal does not need to still wake up according to a wake-up period set by the network side device, thereby reducing electric energy consumption of the terminal and extending a standby time.

As shown in FIG. 6b, in a second implementation of the apparatus, on the basis of the first implementation of the apparatus, the determining unit 601 includes: a first subunit 6011, configured to determine whether the terminal receives a same paging message in two consecutive wake-up periods before adjustment; and if yes, determine that the paging message is retransmitted. The adjusting unit 602 is configured to use a wake-up period before adjustment as the acquired time interval at which the paging message is retransmitted, use 2 as the number R of times that the paging message is retransmitted, and adjust the wake-up period of the terminal to twice the wake-up period before adjustment.

In the second implementation of the apparatus, except that the technical effect of the first implementation of the apparatus may be implemented, and because the wake-up period of the terminal is adjusted to twice the wake-up period before adjustment, the terminal does not miss any paging message for the terminal. Meanwhile, a speed at which the terminal responds to a paging message is not significantly influenced, and user experience is not influenced.

In a third implementation of the apparatus, on the basis of the second implementation of the apparatus, the first subunit 6011 is further configured to, if the terminal receives paging messages for another terminal when the terminal wakes up in two consecutive wake-up periods before adjustment, perform comparison to determine whether the paging messages received during this two times of wake-up are the same; if yes, determine that the paging message is retransmitted; and if no, determine that no paging message is retransmitted.

In the third implementation of the apparatus, except that the technical effect of the second implementation of the apparatus may be implemented, a simple and convenient solution to determining whether a message is retransmitted is also provided.

In a fourth implementation of the apparatus, on the basis of the second implementation of the apparatus, the first subunit is further configured to, if the terminal receives paging messages for another terminal when the terminal wakes up in two consecutive wake-up periods before adjustment, perform comparison to determine whether the paging messages received during this two times of wake-up are the same; if yes, determine that the paging message is retransmitted; and if no, increase, by one, the number of times of determining to be different; if the number of times of the determining to be different is greater than a first preset number of times, determine that no paging message is retransmitted; and if the number of times of the determining to be different is not greater than the first preset number of times, continue to determine whether a paging message received when the terminal wakes up in the latter one of the two consecutive wake-up periods before adjustment during the previous comparison and that received when the terminal wakes up in a next wake-up period before adjustment are the same until it is determined that the paging message is retransmitted or it is determined that no paging message is retransmitted.

In the fourth implementation of the apparatus, except that the technical effect of the second implementation of the apparatus may be implemented, a solution to determining whether a message is retransmitted in a more accurate is also provided, which reduces errors caused by inappropriate selection of a start point for the determining.

In a fifth implementation of the apparatus, on the basis of the third implementation or the fourth implementation of the apparatus, the first subunit 6011 is further configured to, if the terminal receives a message indicating that a paging channel is idle when the terminal wakes up in any wake-up period before adjustment, discard the message indicating that the paging channel is idle.

In the fifth implementation of the apparatus, except that the technical effects of the third implementation and the fourth implementation of the apparatus may be implemented, a processing solution when the paging channel is idle is also provided, which avoids a situation of incorrectly determining that "the network does not support a paging message".

In a sixth implementation of the apparatus, on the basis of the fifth implementation manner, the first subunit 6011 is further configured to, after the message indicating that the paging channel is idle is discarded, increase the number of times of receiving the message indicating that the paging channel is idle by one; if the number of times of receiving the message indicating that the paging channel is idle is greater than a second preset number of times, determine that no paging message is retransmitted; and if the number of times of receiving the message indicating that the paging channel is idle is not greater than the second preset number of times, continue to determine, after the message indicating that the paging channel is idle is received, whether the terminal receives a same paging message in two consecutive wake-up periods before adjustment.

In the sixth implementation of the apparatus, except that the technical effect of the fifth implementation of the apparatus may be implemented, a solution is also provided for processing how to determine whether a paging message is retransmitted when the paging channel is idle for a long time, so that when the paging channel is idle for a long time, a waste of time and resources for determining, which is caused by a failure in obtaining a conclusion about whether a paging message is retransmitted, is avoided.

Figure 6C:
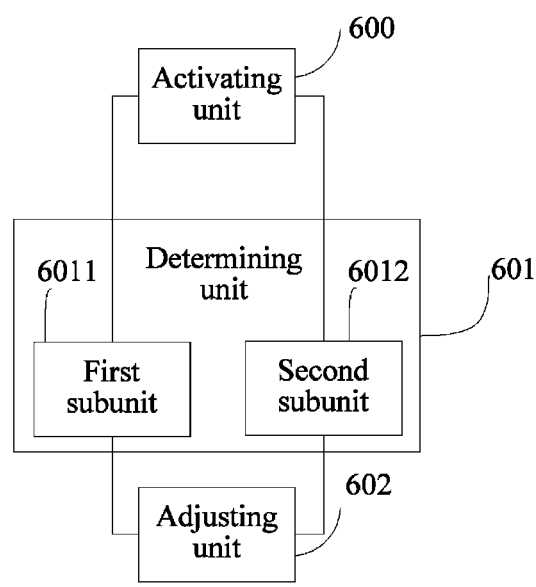
FIG. 6c is a block diagram of a seventh implementation of an apparatus according to an Embodiment 6 of the present invention.

As shown in FIG. 6c, in a seventh implementation of the apparatus, on the basis of the first to sixth implementation manners, the determining unit 601 further includes a second subunit 6012, configured to determine whether the maximum number X of times that the terminal consecutively receives a same paging message in M consecutive wake-up periods before adjustment of the terminal is greater than 1, and if X is greater than 1, determine that the paging message is retransmitted, where M is an integer greater than 1. The adjusting unit 602 is configured to use a wake-up period before adjustment as the time interval at which the paging message is retransmitted, use X as the number R of times that the paging message is retransmitted, and adjust the wake-up period of the terminal to N-fold the wake-up period before adjustment, where N≤X.

In the seventh implementation of the apparatus, except that the technical effects of the first to sixth implementation manners of the apparatus may be implemented, another solution to determining whether a paging message is retransmitted is also provided. The solution has relatively high determination accuracy and is easy to implement.

In an eighth implementation of the apparatus, on the basis of the seventh implementation manner, the second subunit 6012 is further configured to, if X is equal to 1, determine that no paging message is retransmitted.

In the eighth implementation of the apparatus, except that the technical effect of the seventh implementation of the apparatus may be implemented, a processing solution to a situation that X is equal to 1 is also provided, thereby making the solution to determining retransmission of a paging message more complete.

In a ninth implementation of the apparatus, on the basis of the first to eighth implementation manners, the adjusting unit 602 is further configured to, before adjusting the wake-up period of the terminal to N-fold the time interval at which the paging message is retransmitted, wait a preset time; if no interruption event occurs in the preset time, after the wait is over, adjust the wake-up period of the terminal to N-fold the time interval at which the paging message is retransmitted; and if an interruption event occurs in the preset time, from the time when the interruption event occurs, wait the preset time again, and then adjust the wake-up period of the terminal to N-fold the time interval at which the paging message is retransmitted.

In the ninth implementation of the apparatus, except that the technical effects of the first to eighth implementation manners of the apparatus may be implemented, a collision that may be caused by adjusting the wake-up period of the terminal is avoided because of a wait of the preset time before the wake-up period of the terminal is adjusted.

In a tenth implementation of the apparatus, on the basis of the first to ninth implementation manners, the adjusting unit 602 is further configured to, if the terminal enters a new location area, stop the ongoing adjustment of the wake-up period of the terminal.

In the tenth implementation of the apparatus, except that the technical effects of the first to ninth implementation manners of the apparatus may be implemented, adjustment of the wake-up period of the terminal is enabled to always match the performance of the location area in which the terminal currently lies, which avoids a situation that the terminal misses a paging message when the period and the performance do not match.

Alternatively, on the basis of the first to tenth implementation manners of the apparatus, the apparatus may further include a transmitting unit and a receiving unit. The transmitting unit is configured to transmit a request message to the network side device, where the request message is used to request the network side device to allow adjustment of the wake-up period of the terminal to N-fold the time interval at which the paging message is retransmitted. The receiving unit is configured to receive a response that is sent by the network side device and indicates that the adjustment is allowed. The adjusting unit 602 is further configured to, if the receiving unit receives the response that is sent by the network side device and indicates that the adjustment is allowed, adjust the wake-up period of the terminal to N-fold the time interval at which the paging message is retransmitted; otherwise, stop the ongoing adjustment of the wake-up period of the terminal and keep the wake-up period before adjustment unchanged. In the process of requesting a permit from the network side device, the network side device may learn that the wake-up period of the terminal is being adjusted, and may control whether the adjustment is to be performed.

It should be noted that, when the solution to requesting a permit from the network side device is combined with the ninth and tenth implementation manners of the apparatus, after the transmitting unit and the receiving unit firstly complete the process of requesting a permit from the network side device and the adjusting unit determines that the receiving unit receives the response that is sent by the network side device and indicates that the adjustment is allowed, the process of waiting the preset time may be executed. Alternatively, after the adjusting unit firstly executes the process of waiting the preset time, the transmitting unit and the receiving unit then complete the process of requesting a permit from the network side device, and the adjusting unit determines that the receiving unit receives the response that is sent by the network side device and indicates that the adjustment is allowed, the wake-up period of the terminal is adjusted.

Embodiment 7

An embodiment of the present invention further provides a terminal.

In a first implementation of the terminal, the terminal includes at least one processor 701, configured to determine whether a network side device retransmits a paging message in a location area in which the terminal lies; and if a paging message is retransmitted, acquire a time interval at which the paging message is retransmitted and the number R of times that the paging message is retransmitted, and adjust a wake-up period of the terminal to N-fold the time interval at which the paging message is retransmitted, where N is an integer and $2 \leq N \leq R$.

In the first implementation of the terminal, when it is identified that the network side device repeatedly transmits a paging message in the location area in which the terminal lies, the wake-up period of the terminal is adjusted to N-fold the time interval at which the paging message is retransmitted, where N is an integer and $2 \leq N \leq R$, so that when the location area in which the terminal lies has the performance of retransmitting a paging message, the terminal does not need to still wake up according to a wake-up period set by the network side device, thereby reducing electric energy consumption of the terminal and extending a standby time.

Figure 7:
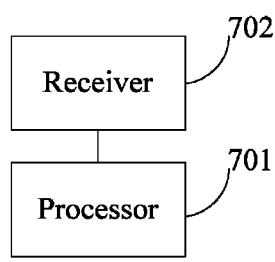
FIG. 7 is a block diagram of a terminal according to an Embodiment 7 of the present invention.

In a second implementation of the terminal, on the basis of the first implementation of the terminal, as shown in FIG. 7, the terminal further includes: a receiver 702, configured to, when the terminal wakes up in each wake-up period before adjustment, receive a message delivered by the network side device.

In a third implementation of the terminal, on the basis of the first or second implementation of the terminal, the at least one processor 701 is configured to determine whether the terminal receives a same paging message in two consecutive wake-up periods before adjustment; if yes, determine that the paging message is retransmitted; use a wake-up period before adjustment as the acquired time interval at which the paging message is retransmitted, and use 2 as the number R of times that the paging message is retransmitted; and adjust the wake-up period of the terminal to twice the wake-up period before adjustment.

In the third implementation of the terminal, except that the technical effect of the first implementation of the terminal may be implemented, because the wake-up period of the terminal is adjusted to twice the wake-up period before adjustment, the terminal does not miss any paging message for itself. Meanwhile, a speed at which the terminal responds to a paging message is not significantly influenced, and user experience is not influenced.

In a fourth implementation of the terminal, on the basis of the third implementation of the terminal, the at least one processor 701 is further configured to, if the receiver receives paging messages for another terminal when the terminal wakes up in two consecutive wake-up periods before adjustment, perform comparison to determine whether the paging messages received during this two times of wake-up are the same; if yes, determine that the paging message is retransmitted; and if no, determine that no paging message is retransmitted.

In the fourth implementation of the terminal, except that the technical effect of the third implementation of the terminal may be implemented, a simple and convenient solution to determining whether a message is retransmitted is also provided.

In a fifth implementation of the terminal, on the basis of the third implementation of the terminal, the at least one processor 701 is further configured to, if the receiver receives paging messages for another terminal when the terminal wakes up in two consecutive wake-up periods before adjustment, perform comparison to determine whether the paging messages received during this two times of wake-up are the same; if yes, determine that the paging message is retransmitted; if no, increase, by one, the number of times of determining to be different; if the number of times of the determining to be different is greater than a first preset number of times, determine that no paging message is retransmitted; and if the number of times of the determining to be different is not greater than the first preset number of times, continue to determine whether a paging message received when the terminal wakes up in the latter one of the two consecutive wake-up periods before adjustment during the previous comparison and a paging message received when the terminal wakes up in a next wake-up period before adjustment are the same until it is determined that the paging message is retransmitted or it is determined that no paging message is retransmitted.

In the fifth implementation of the terminal, except that the technical effect of the third implementation of the terminal may be implemented, a solution to determining whether a message is retransmitted in a more accurate is also provided, which reduces errors resulting from inappropriate selection of a start point for the determining.

In a sixth implementation of the terminal, on the basis of the fourth and fifth implementation manners of the terminal, the at least one processor 701 is further configured to, if the receiver receives a message indicating that a paging channel is idle when the terminal wakes up in any wake-up period before adjustment, discard the message indicating that the paging channel is idle.

In the sixth implementation of the terminal, except that the technical effects of the fourth implementation and the fifth implementation of the terminal may be implemented, a processing solution when the paging channel is idle is also provided, which avoids a situation of incorrectly determining that "the network does not support a paging message".

In a seventh implementation of the terminal, on the basis of the sixth implementation of the terminal, the at least one processor 701 is further configured to, after the message indicating that the paging channel is idle is discarded, increase the number of times of receiving the message indicating that the paging channel is idle by one; if the number of times of receiving the message indicating that the paging channel is idle is greater than a second preset number of times, determine that no paging message is retransmitted; and if the number of times of receiving the message indicating that the paging channel is idle is not greater than the second preset number of times, continue to determine, after the message indicating that the paging channel is idle is received, whether the terminal receives a same paging message in two consecutive wake-up periods before adjustment.

In the seventh implementation of the terminal, except that the technical effect of the sixth implementation of the terminal may be implemented, a solution is also provided for processing how to determine whether a paging message is retransmitted when the paging channel is idle for a long time, so that when the paging channel is idle for a long time, a waste of time and resources for determining, which is caused by a failure in obtaining a conclusion about whether a paging message is retransmitted, is avoided.

In an eighth implementation of the terminal, on the basis of the first to seventh implementation manners of the terminal, the at least one processor 701 is further configured to determine whether the maximum number X of times that the receiver consecutively receives a same paging message in M consecutive wake-up periods before adjustment of the terminal is greater than 1, and if X is greater than 1, determine that the paging message is retransmitted, where M is an integer greater than 1; use the wake-up period before adjustment as the time interval at which the paging message is retransmitted, and use X as the number R of times that the paging message is retransmitted; and adjust the wake-up period of the terminal to N-fold the wake-up period before adjustment, where N≤X.

In the eighth implementation of the apparatus, except that the technical effects of the first to seventh implementation manners of the terminal may be implemented, another solution to determining whether a paging message is retransmitted is also provided. The solution has relatively high determination accuracy and is easy to implement.

In a ninth implementation of the terminal, on the basis of the eighth implementation of the terminal, the at least one processor 701 is further configured to, if X is equal to 1, determine that no paging message is retransmitted.

In the ninth implementation of the terminal, except that the technical effect of the eighth implementation of the terminal may be implemented, a processing solution to a situation that X is equal to 1 is also provided, thereby making the solution to determining retransmission of a paging message more complete.

In a tenth implementation of the terminal, on the basis of the first to ninth implementation manners of the terminal, the at least one processor 701 is further configured to, before adjusting the wake-up period of the terminal to N-fold the time interval at which the paging message is retransmitted, wait a preset time; if no interruption event occurs in the preset time, after the wait is over, adjust the wake-up period of the terminal to N-fold the time interval at which the paging message is retransmitted; and if no interruption event occurs in the preset time, from the time when the interruption event occurs, wait the preset time again, and then adjust the wake-up period of the terminal to N-fold the time interval at which the paging message is retransmitted.

In the tenth implementation of the terminal, except that the technical effects of the first to ninth implementation manners of the terminal may be implemented, a collision that may be caused by adjusting the wake-up period of the terminal is avoided because of a wait of the preset time before the wake-up period of the terminal is adjusted.

In an eleventh implementation of the terminal, on the basis of the first to tenth implementation manners of the terminal, the at least one processor 701 is further configured to, if the terminal enters a new location area, stop the ongoing adjustment of the wake-up period of the terminal.

In the eleventh implementation of the terminal, except that the technical effects of the first to tenth implementation manners of the terminal may be implemented, adjustment of a paging period of the terminal is enabled to always match the performance of the location area in which the terminal currently lies, which avoids a situation that the terminal misses a paging message when the period and the performance do not match.

Figure 8:
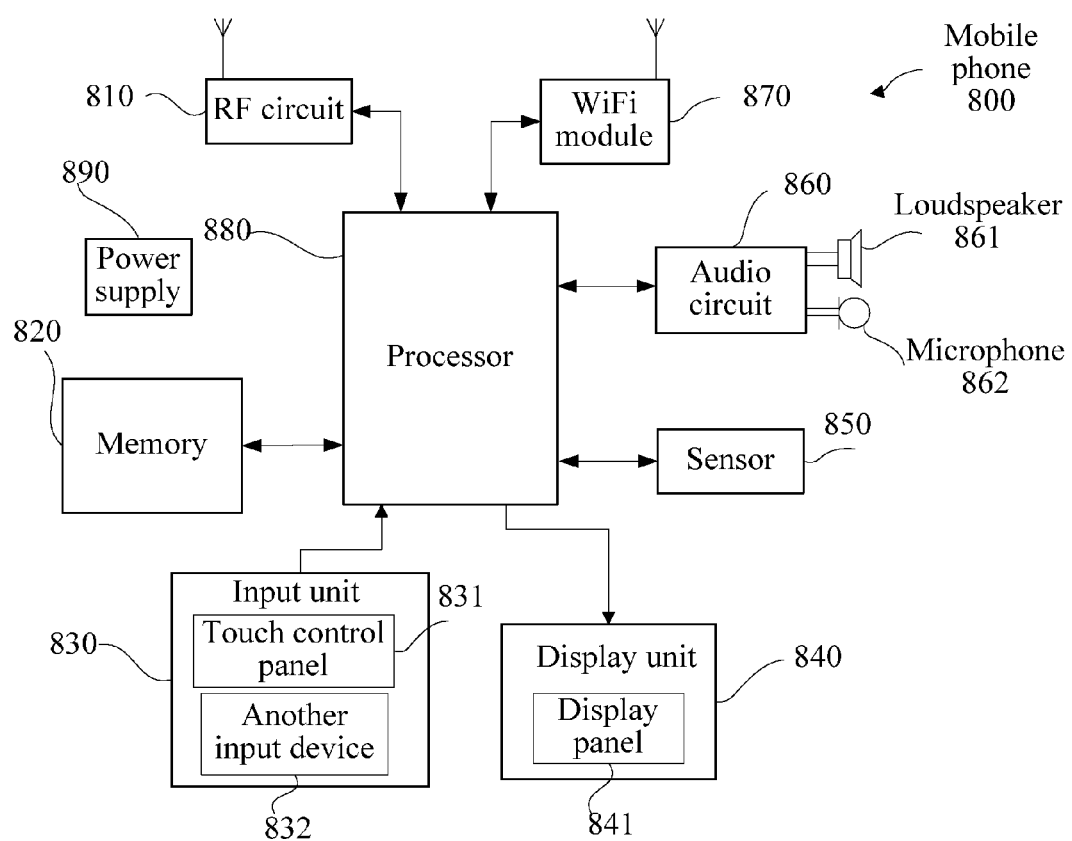
FIG. 8 is a block diagram of a mobile phone according to an embodiment of the present invention.

The terminal in the first to eleventh implementations may be a mobile phone. FIG. 8 is a block diagram of a mobile phone 800 illustrating an embodiment of the present invention. The mobile phone 800 may include a processor 880, a radio frequency RF circuit 810, a memory 820, an input unit 830, a display unit 840, a sensor 850, an audio circuit 860, a wireless fidelity WiFi module 870, and a power supply 190. The processor 701 may be implemented by the processor 880, and the receiver 702 may be implemented by the RF circuit 810.

Alternatively, on the basis of the first to eleventh implementation manners of the terminal, the terminal may further include: a transmitter, configured to transmit a request message to the network side device, where the request message is used to request the network side device to allow adjustment of the wake-up period of the terminal to N-fold the time interval at which the paging message is retransmitted. On the basis of an implementation in which a receiver is not included, the terminal further includes: a receiver, configured to receive a response that is sent by the network side device and indicates that the adjustment is allowed. On the basis of an implementation in which a receiver is included, the receiver is further configured to receive a response that is sent by the network side device and indicates that the adjustment is allowed. On the basis of an implementation regardless of whether a receiver is included, the processor 880 is further configured to, if the receiver 702 receives a response that is sent by the network side device and indicates that the adjustment is allowed, adjust the wake-up period of the terminal to N-fold the time interval at which the paging message is retransmitted; otherwise, stop the ongoing adjustment of the wake-up period of the terminal and keep the wake-up period before adjustment unchanged. In the process of requesting a permit from the network side device, the network side device may learn that the wake-up period of the terminal is being adjusted, and may control whether the adjustment is to be performed.

It should be noted that, when the solution to requesting a permit from the network side device is combined with the tenth and eleventh implementation manners of the apparatus, after the transmitter and the receiver firstly complete the process of requesting a permit from the network side device and the processor determines that the receiving unit receives the response that is sent by the network side device and indicates that the adjustment is allowed, the process of waiting the preset time may be executed. Alternatively, after the processor firstly executes the process of waiting the preset time, the transmitter and the receiver then complete the process of requesting a permit from the network side device, and the processor determines that the receiving unit receives the response that is sent by the network side device and indicates that the adjustment is allowed, the wake-up period of the terminal is adjusted.

Although the present invention has been described with reference to specific features and embodiments thereof, it should be understood that various changes and substitutions can be made thereto without departing from the spirit and scope of the invention as defined by the following claims.

What is claimed is:

1. A method for adjusting a wake-up period of a terminal in a communications system, comprising:
   determining whether a network-side device retransmits a paging message in an area in which the terminal is located; and
   in response to determining that a paging message is retransmitted:
      acquiring a time interval at which the paging message is retransmitted and the number R of times that the paging message is retransmitted,
      waiting a preset time;
      adjusting, in response to determining that the preset time is over and that no interruption event occurred in the preset time, a wake-up period of the terminal to a value equal to N times the time interval at which the paging message is retransmitted, wherein N is an integer and $2 \leq N \leq R$, and wherein the interruption event is an event that demands configuration of a physical layer on the terminal and the wake-up period of the terminal is stored in the physical layer; and
      adjusting, in response to determining that an interruption event occurred in the preset time, the wake-up period of the terminal to a value equal to N times the time interval at which the paging message is retransmitted, and waiting the preset time again, the preset time beginning from the time the interruption even occurred.

2. The method according to claim 1, wherein:
   the determining whether a network side device retransmits a paging message in a location area in which a terminal lies specifically is: determining whether the terminal receives a same paging message in two consecutive wake-up periods before adjustment; and if yes, determining that the paging message is retransmitted;
   the acquired time interval at which the paging message is retransmitted comprises a wake-up period before adjustment;
   the number R of times that the paging message is retransmitted equals two; and
   the wake-up period of the terminal is adjusted to a value twice the value of the wake-up period before adjustment.

3. The method according to claim 2, wherein:
   the determining whether the terminal receives a same paging message in two consecutive wake-up periods before adjustment comprises: if the terminal receives paging messages for another terminal when waking up in two consecutive wake-up periods before adjustment, performing a comparison to determine whether the paging messages received during the two consecutive wake-up periods are the same;
   if so, determining that the paging message is retransmitted.

4. The method according to claim 3, wherein the method further comprises:
   determining that no paging message is retransmitted, if it is determined that the paging messages received during the two consecutive wake-up periods are not the same.

5. The method according to claim 2, wherein the determining whether the terminal receives a same paging message in two consecutive wake-up periods before adjustment comprises:
   if the terminal receives paging messages for another terminal when waking up in the two consecutive wake-up periods before adjustment, performing a comparison to determine whether the paging messages received during this two times of wake-up are the same;
   if yes, determining that the paging message is retransmitted; and
   if no, increasing, by one, the number of times of determining to be different; if the number of times of the determining to be different is greater than a first preset number of times, determining that no paging message is retransmitted.

6. The method according to claim 5, wherein the method further comprises: if the number of times of the determining to be different is not greater than the first preset number of times, continuing to determine whether a paging message received when the terminal wakes up in the latter one of the two consecutive wake-up periods before adjustment during the previous comparison and a paging message received when the terminal wakes up in a next wake-up period before adjustment are the same until it is determined that the paging message is retransmitted or it is determined that no paging message is retransmitted.

7. The method according to claim 3, wherein the determining whether the terminal receives a same paging message in two consecutive wake-up periods before adjustment further comprises:
   if the terminal receives a message indicating that a paging channel is idle when waking up in any wake-up period before adjustment, discarding the message indicating that the paging channel is idle.

8. The method according to claim 7, wherein after the discarding the message indicating that the paging channel is idle, the method further comprises: increasing the number of times of receiving the message indicating that the paging channel is idle by one; if the number of times of receiving the message indicating that the paging channel is idle is greater than a second preset number of times, determining that no paging message is retransmitted; and if the number of times of receiving the message indicating that the paging channel is idle is not greater than the second preset number of times, continuing to determine, after the message indicating that the paging channel is idle is received, whether the terminal receives a same paging message in two consecutive wake-up periods before adjustment.

9. The method according to claim 1, wherein the determining whether a network side device retransmits a paging message in a location area in which a terminal lies specifically is:
   determining whether the maximum number X of times that the terminal consecutively receives a same paging message in M consecutive wake-up periods before adjustment is greater than 1, and if X is greater than 1, determining that the paging message is retransmitted, wherein M is an integer greater than 1;
   the acquired time interval at which the paging message is retransmitted comprises: a wake-up period before adjustment, and the number R of times that the paging message is retransmitted equals X; and
   the wake-up period of the terminal is adjusted to a value equal to N times the wake-up period before adjustment, wherein $N \leq X$.

10. The method according to claim 9, wherein the determining whether a network side device retransmits a paging message in a location area in which a terminal lies further comprises: if X is greater than 1, determining that no paging message is retransmitted.

11. The method according to claim 1, further comprising: if the terminal enters a new location area, stopping the ongoing adjustment of the wake-up period of the terminal.

12. A terminal in a communications system, comprising:
at least one processor configured to determine whether a network-side device retransmits a paging message in an area in which the terminal is located; and in response to determining that a paging message is retransmitted, the processor is further configured to:
acquire a time interval at which the paging message is retransmitted and the number R of times that the paging message is retransmitted,
wait a preset time;
adjust, in response to determining that no interruption event occurred in the preset time, a wake-up period of the terminal to a value equal to N times the time interval at which the paging message is retransmitted, wherein N is an integer and 2≤N≤R, wherein the interruption event is an event that demands configuration of a physical layer on the terminal and the wake-up period of the terminal is stored in the physical layer; and
adjust, in response to determining that an interruption event occurred in the preset time, the wake-up period of the terminal to a value equal to N times the time interval at which the paging message is retransmitted, and wait the preset time again, the preset time beginning from the time the interruption even occurred.

13. The terminal according to claim 12, further comprising:
a receiver configured to receive a message delivered by the network side device when the terminal wakes up in each wake-up period before adjustment.

14. The terminal according to claim 12, wherein:
the at least one processor is specifically configured to determine whether the terminal receives a same paging message in two consecutive wake-up periods before adjustment; if yes, determine that the paging message is retransmitted, use the wake-up period before adjustment as the acquired time interval at which the paging message is retransmitted, and use 2 as the number R of times that the paging message is retransmitted; and adjust the wake-up period of the terminal to a value twice the value of the wake-up period before adjustment.

15. The terminal according to claim 14, wherein the at least one processor is further configured to, if the terminal receives paging messages for another terminal when the terminal wakes up in two consecutive wake-up periods before adjustment, perform a comparison to determine whether the paging messages received during the two consecutive wake-up periods are the same; if so, determine that the paging message is retransmitted.

16. The terminal according to claim 15, wherein the at least one processor is further configured to determine that no paging message is retransmitted if the paging messages received during the two consecutive wake-up periods are not the same.

17. The terminal according to claim 14, wherein the at least one processor is further configured to, if the receiver receives paging messages for another terminal when the terminal wakes up in two consecutive wake-up periods before adjustment, perform comparison to determine whether the paging messages received during this two times of wake-up are the same;
if yes, determine that the paging message is retransmitted; and
if no, increase, by one, the number of times of determining to be different; if the number of times of the determining to be different is greater than a first preset number of times, determine that no paging message is retransmitted.

18. The terminal according to claim 17, wherein the at least one processor is further configured to: if the number of times of the determining to be different is not greater than the first preset number of times, continue to determine whether a paging message received when the terminal wakes up in the latter one of the two consecutive wake-up periods before adjustment during the previous comparison and a paging message received when the terminal wakes up in a next wake-up period before adjustment are the same until it is determined that the paging message is retransmitted or it is determined that no paging message is retransmitted.

19. The terminal according to claim 15, wherein the at least one processor is further configured to, if the receiver receives a message indicating that a paging channel is idle when the terminal wakes up in any wake-up period before adjustment, discard the message indicating that the paging channel is idle.

20. The terminal according to claim 19, wherein the at least one processor is further configured to, after the message indicating that the paging channel is idle is discarded, increase the number of times of receiving the message indicating that the paging channel is idle by one; if the number of times of receiving the message indicating that the paging channel is idle is greater than a second preset number of times, determine that no paging message is retransmitted; and if the number of times of receiving the message indicating that the paging channel is idle is not greater than the second preset number of times, continue to determine, after the message indicating that the paging channel is idle is received, whether the terminal receives a same paging message in two consecutive wake-up periods before adjustment.

21. The terminal according to claim 12, wherein the at least one processor is further configured to determine whether the maximum number X of times that the receiver consecutively receives a same paging message in M consecutive wake-up periods before adjustment of the terminal is greater than 1, and if X is greater than 1, determine that the paging message is retransmitted, wherein M is an integer greater than 1; use the wake-up period before adjustment as the time interval at which the paging message is retransmitted, and the number R of times that the paging message is retransmitted equals X; and adjust the wake-up period of the terminal to a value equal to N times the wake-up period before adjustment, wherein N≤X.

22. The terminal according to claim 21, wherein the at least one processor is further configured to, if X is equal to 1, determine that no paging message is retransmitted.

23. The terminal according to claim 12, wherein the at least one processor is further configured to, if the terminal enters a new location area, stop the ongoing adjustment of the wake-up period of the terminal.

* * * * *